US012784130B2

(12) United States Patent
Chung

(10) Patent No.: US 12,784,130 B2
(45) Date of Patent: Nov. 3, 2026

(54) METHOD OF GENERATING IMAGE SIGNAL AND DISPLAY SYSTEM

(71) Applicant: ATEN INTERNATIONAL CO., LTD., New Taipei City (TW)

(72) Inventor: Yung-Yi Chung, New Taipei City (TW)

(73) Assignee: ATEN INTERNATIONAL CO., LTD., New Taipei City (TW)

( * ) Notice: Subject to any disclaimer, the term of this patent is extended or adjusted under 35 U.S.C. 154(b) by 248 days.

(21) Appl. No.: 18/628,787

(22) Filed: Apr. 7, 2024

(65) Prior Publication Data

US 2024/0428372 A1 Dec. 26, 2024

(30) Foreign Application Priority Data

Jun. 21, 2023 (TW) ................................ 112123404

(51) Int. Cl.
*G06T 3/40* (2024.01)
*G06T 7/00* (2017.01)
*G09G 3/20* (2006.01)

(52) U.S. Cl.
CPC .............. *G06T 3/40* (2013.01); *G06T 7/0002* (2013.01); *G09G 3/2096* (2013.01); *G06T 2207/20081* (2013.01); *G09G 2340/0435* (2013.01)

(58) Field of Classification Search
CPC .................... G06T 3/40; G09G 3/2096; G09G 2340/0435; G09G 3/20
See application file for complete search history.

(56) References Cited

U.S. PATENT DOCUMENTS

| | | | | |
|---|---|---|---|---|
| 7,956,856 B2 | 6/2011 | Yu et al. | | |
| 10,154,320 B2 | 12/2018 | Labrozzi et al. | | |
| 11,741,898 B1 * | 8/2023 | Klement | G09G 3/3233 345/204 | |
| 12,198,657 B2 * | 1/2025 | Shimizu | G09G 5/363 | |
| 2024/0038199 A1 * | 2/2024 | Shimizu | H04N 5/04 | |
| 2026/0188176 A1 * | 7/2026 | Lee | G09G 3/20 | |

FOREIGN PATENT DOCUMENTS

| | | | |
|---|---|---|---|
| CN | 102439989 B | 12/2014 | |
| KR | 102287512 B1 * | 8/2021 | G09G 3/3208 |
| TW | I749929 B | 12/2021 | |

* cited by examiner

*Primary Examiner* — George Eng
(74) *Attorney, Agent, or Firm* — CKC & Partners Co., LLC

(57) ABSTRACT

A method of generating image signals includes: receiving a first input image signal and a second input image signal by a processing device; outputting, by the processing device, an output image signal having an output resolution according to the first input image signal and the second input image signal; and outputting the output image signal from the processing device to a display device. An ending edge of a first frame image pulse of the first input image signal is at a first moment, an ending edge of a first output frame image pulse of the output image signal is at a second moment, a first time length from the first moment to the second moment is smaller than a time length of the first output frame image pulse.

19 Claims, 4 Drawing Sheets

METHOD OF GENERATING IMAGE SIGNAL AND DISPLAY SYSTEM

CROSS-REFERENCE TO RELATED APPLICATION

This application claims priority to Taiwan Application Serial Number 112123404, filed Jun. 21, 2023, which is herein incorporated by reference in its entirety.

BACKGROUND

Technical Field

The present disclosure relates to a display technique. More particularly, the present disclosure relates to a method of generating image signals and a display system.

Description of Related Art

In conventional image output technology, the frame updating rate is fixed, such that there is a time difference of one or two frame between a displayed frame image and a frame image of an input image signal, which is a disadvantage to applications required rapid reactions, such as Esports games. Furthermore, when switching between input image signals, the output image signal has problems of stepping and dropping frames. Thus, techniques associated with the development for overcoming the problems described above are important issues in the field.

SUMMARY

The present disclosure provides a method of generating image signals includes: receiving a first input image signal and a second input image signal by a processing device; outputting, by the processing device, an output image signal having an output resolution according to the first input image signal and the second input image signal; and outputting the output image signal from the processing device to a display device. An ending edge of a first frame image pulse of the first input image signal is at a first moment, an ending edge of a first output frame image pulse of the output image signal is at a second moment, a first time length from the first moment to the second moment is smaller than a time length of the first output frame image pulse, the first output frame image pulse corresponds to a first output frame image, the first frame image pulse corresponds to a first frame image, and the first output frame image is a version of the first frame image having the output resolution.

The present disclosure provides a display system. The display system includes a processing device and a display device. The processing device generates an output image signal at least according to a first image signal. The display device electrically coupled to the processing device and displaying images according to the output image signal. The processing device obtaining an output resolution of a first output frame image pulse of the output image signal according to a first resolution of a first frame image pulse of the first image signal and a resolution required by the display device, and adjusting a starting edge of the first output frame image pulse to a third moment between a first moment and a second moment, a starting edge of the first frame image pulse is at the first moment, and an ending edge of the first frame image pulse is at the second moment.

The present disclosure provides a method of generating image signals includes: receiving a first input image signal and a second input image signal by a processing device; outputting, by the processing device, an output image signal having an output resolution according to the first input image signal and the second input image signal; and outputting the output image signal from the processing device to a display device. An ending edge of a first frame image pulse of the first input image signal is at a first moment, an ending edge of a first output frame image pulse of the output image signal is at a second moment, a first time length from the first moment to the second moment is smaller than a time length of the first output frame image pulse, the first output frame image pulse corresponds to a first output frame image, the first frame image pulse corresponds to a first frame image, the first output frame image is a version of the first frame image having the output resolution, a starting edge of the first frame image pulse is at a third moment a starting edge of the first output frame image pulse is at a fourth moment, and the fourth moment is between the third moment and the first moment.

It is to be understood that both the foregoing general description and the following detailed description are examples, and are intended to provide further explanation of the disclosure as claimed.

BRIEF DESCRIPTION OF THE DRAWINGS

Aspects of the present disclosure are best understood from the following detailed description when read with the accompanying FIGURES. It is noted that, in accordance with the standard practice in the industry, various features are not drawn to scale. In fact, the dimensions of the various features may be arbitrarily increased or reduced for clarity of discussion.

DETAILED DESCRIPTION

In the present disclosure, when an element is referred to as "connected" or "coupled", it may mean "electrically connected" or "electrically coupled". "Connected" or "coupled" can also be used to indicate that two or more components operate or interact with each other. In addition, although the terms "first", "second", and the like are used in the present disclosure to describe different elements, the terms are used only to distinguish the elements or operations described in the same technical terms. The use of the term is not intended to be a limitation of the present disclosure.

Unless otherwise defined, all terms (including technical and scientific terms) used in the present disclosure have the same meaning as commonly understood by the ordinary skilled person to which the concept of the present invention belongs. It will be further understood that terms (such as those defined in commonly used dictionaries) should be interpreted as having a meaning consistent with its meaning in the related technology and/or the context of this specification and not it should be interpreted in an idealized or overly formal sense, unless it is clearly defined as such in this article.

Figure 1:
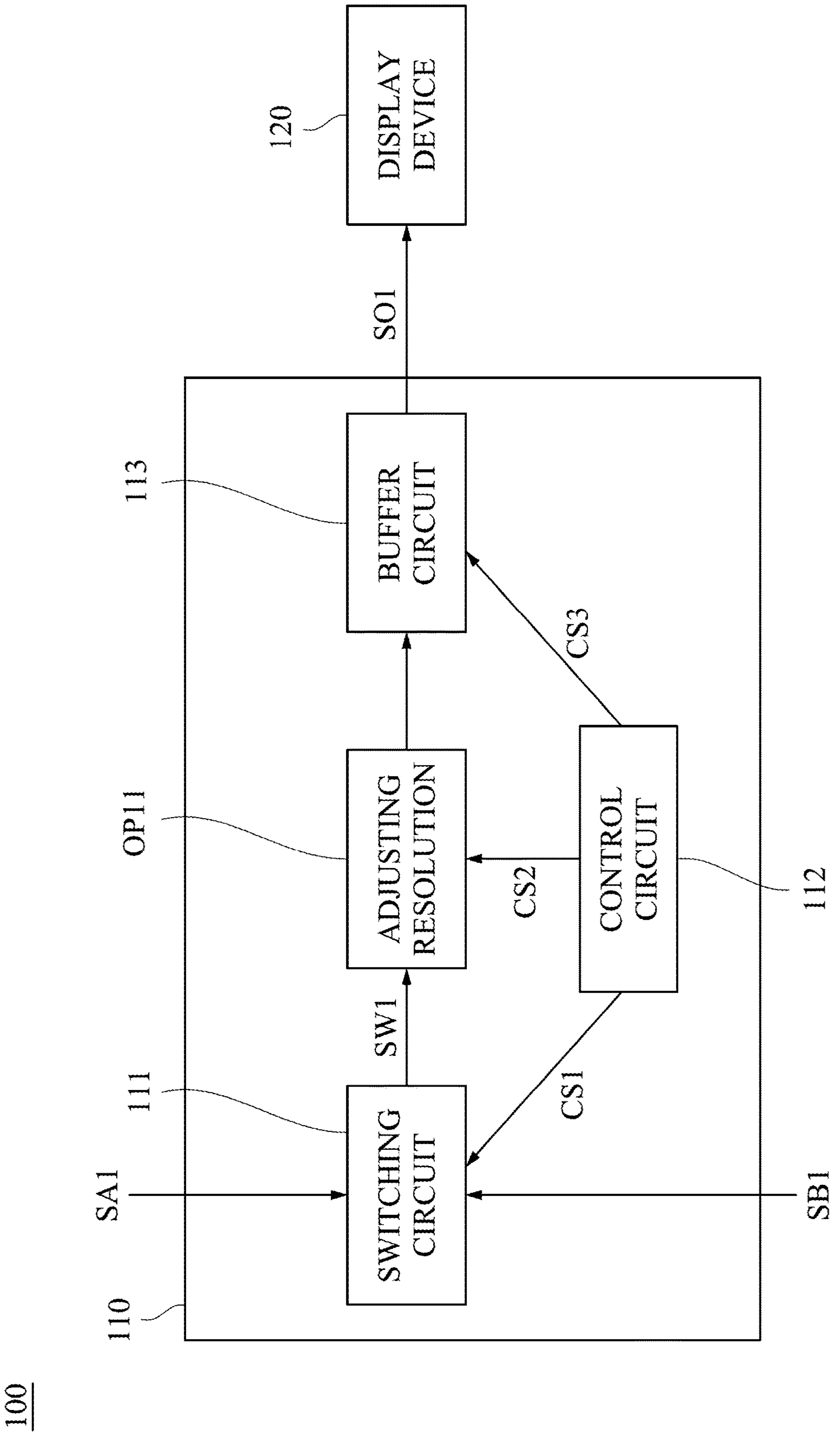
FIG. 1 is a schematic diagram of a display system illustrated according to some embodiment of present disclosure.

FIG. 1 is a schematic diagram of a display system 100 illustrated according to some embodiment of present disclosure. The display system 100 includes a processing device 110 and a display device 120. The processing device 110 receives input image signals SA1 and SB1, and generates an output image signal SO1 according to the input image signals SA1 and SB1. The display device 120 is electrically coupled to the processing device 110, to receive the output image signal SO1, and display corresponding images according to the output image signal SO1. In some embodiments, the display device can be implemented by a screen, but the present disclosure is not limited to this.

As shown in FIG. 1, the processing device 110 can include a switching circuit 111, a control circuit 112 and a buffer circuit 113. The switching device 111 can generate a switching image signal SW1 according to the input image signals SA1 and SB1. The processing device 110 can perform an operation OP11 of adjusting resolution to the switching image signal SW1 and store the switching image signal SW1 into the buffer circuit 113 afterward, and output the output image signal SO1 from the buffer circuit 113 at corresponding moments after calculating the timing by the control circuit 112. The control circuit 112 can generate control signals CS1-CS3 to control the operations of the processing device 110. In some embodiments, the operation OP11 of adjusting resolution can be performed after the buffer circuit 113, and can be performed before and after the buffer circuit 113. It is noted that the operation OP11 of adjusting resolution is performed according to the control signal CS2, and is combined with, for example, an electronic element (such as scalar) having resolution zoom ability to be implemented.

For example, the control circuit 112 can generate the control signal CS1 according to a switch port command, such that the switching circuit 111 switches from the input image signal SA1 to the input image signal SB1 to generate the switching image signal SW1. The control circuit 112 can also generate the control signal CS2 according to the resolution configured for the display device 120, such that the processing device 110 adjusts the switching image signal SW1 to the resolution corresponding to the display device 120 according to the control signal CS2, to generate the output image signal SO1. The control circuit 112 can also generate the control signal CS3 according to the resolution of the input image signal SA1, the resolution of the input image signal SB1 and the resolution of the output image signal SO1, to control the output timing of the output image signal SO1. In some embodiments, the processing device 110 obtains the output resolution of the output image signal SO1 according to the resolution required by the display device 120.

In some embodiments, the resolution and the timing have a corresponding relationship. In present disclosure, the resolution can be represented as the resolution timing. For example, the resolution of the input image signal SA1, the resolution of the input image signal SB1 and the resolution of the output image signal SO1 can be represented as the resolution timing of the input image signal SA1, the resolution timing of the input image signal SB1 and the resolution timing of the output image signal SO1, respectively. The timing can also be represented as the resolution timing. For example, the output timing of the output image signal SO1 can be represented as the output resolution timing of the output image signal SO1.

In summary, the processing device 110 performs calculations to the resolutions of the input image signal SA1, SB1 and the output image signal SO1, to determine the timing of the output image signal SO1. In some embodiments, the processing device 110 can store associated data of the image signals and the resolutions, for performing the calculations.

Figure 2:
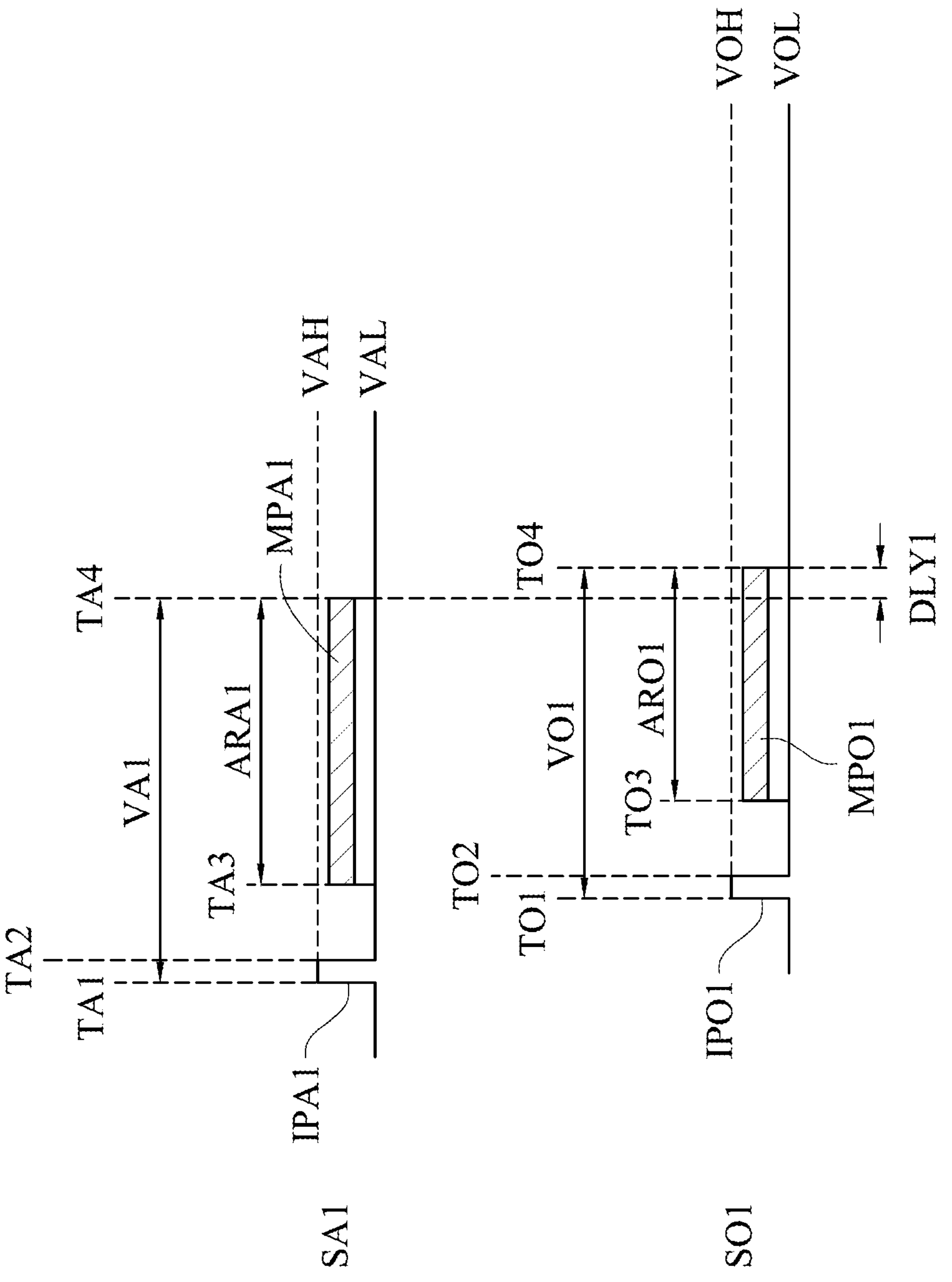
FIG. 2 is a timing diagram of the input image signal and the output image signal shown in FIG. 1, illustrated according to some embodiment of present disclosure.

FIG. 2 is a timing diagram of the input image signal SA1 and the output image signal SO1 shown in FIG. 1, illustrated according to some embodiment of present disclosure. The input image signal SA1 includes an initial pulse IPA1 and a frame image pulse MPA1. The output image signal SO1 includes an output initial pulse IPO1 and an output frame image pulse MPO1. In some embodiments, the initial pulse can be represented as a frame synchronic pulse, and the frame image pulse can be represented as a frame image stream timing.

As shown in FIG. 2, a starting edge of the initial pulse IPA1 is at a moment TA1, and an ending edge of the initial pulse IPA1 is at a moment TA2. A starting edge of the frame image pulse MPA1 is at a moment TA3, and an ending edge of the frame image pulse MPA1 is at a moment TA4. The moments TA1-TA4 are arranged in order. In some embodiments, the starting edge can correspond to a frame image starting, and the ending edge can correspond to a frame image ending. In some embodiments, the starting edge is a rising edge and the ending edge is a falling edge. In other embodiments, the starting edge is a falling edge and the ending edge is a rising edge.

Before the moment TA1, the input image signal SA1 is maintained at a voltage level VAL. From the moment TA1 to the moment TA2, the input image signal SA1 is maintained at a voltage level VAH, to generate the initial pulse IPA1. From the moment TA2 to the moment TA3, the input image signal SA1 is maintained at the voltage level VAL. From the moment TA3 to the moment TA4, the input image signal SA1 has the frame image pulse MPA1. After the moment TA4, the input image signal SA1 is maintained at the voltage level VAL. It is noted that, in present disclosure, the voltage levels VAH and VAL can be used to represent, for example, logic of 1 or 0.

In some embodiments, the voltage levels of the frame image pulse MPA1 correspond to multiple pixels of a frame image arranged in multiple columns and multiple rows. For example, a pixel of the frame image corresponds to a period in the frame image pulse MPA1, the voltage level of the frame image pulse MPA1 in the period described above can determine the brightness of the pixel described above. In some embodiments, when the voltage levels of the frame image pulse MPA1 in a period is higher, the brightness of one or more pixel corresponding to the period described above is higher.

Similarly, a starting edge of the output initial pulse IPO1 is at a moment TO1, and an ending edge of the output initial pulse IPO1 is at a moment TO2. A starting edge of the output frame image pulse MPO1 is at a moment TO3, and an ending edge of the output frame image pulse MPO1 is at a moment TO4. The moments TO1-TO4 are arranged in order.

Before the moment TO1, the input image signal SO1 is maintained at a voltage level VOL. From the moment TO1 to the moment TO2, the input image signal SO1 is maintained at a voltage level VOH, to generate the initial pulse IPO1. From the moment TO2 to the moment TO3, the input image signal SO1 is maintained at the voltage level VOL. From the moment TO3 to the moment TO4, the input image signal SO1 has the frame image pulse MPO1. After the moment TO4, the input image signal SO1 is maintained at the voltage level VOL.

In some embodiments, the voltage levels of the output frame image pulse MPO1 correspond to multiple pixels of an output frame image arranged in multiple columns and multiple rows. For example, a pixel of the output frame image corresponds to a period in the output frame image pulse MPO1, the voltage level of the output frame image pulse MPO1 in the period described above can determine the brightness of the pixel described above. In some embodiments, when the voltage levels of the output frame image pulse MPO1 in a period is higher, the brightness of one or more pixel corresponding to the period described above is higher.

In some embodiments, the initial pulse IPA1 can trigger the processing device 110, such that the processing device 110 prepares to process the following frame image pulse MPA1. The output initial pulse IPO1 can trigger the display device 120, such that the display device 120 prepares to display a corresponding output frame image according to the following output frame image pulse MPO1.

Referring to FIG. 1 and FIG. 2, the processing device 110 processes the frame image pulse MPA1 to generate the output frame image pulse MPO1. The processing device 110 transforms the corresponding frame image of the frame image pulse MPA1 to the output resolution of the output image signal SO1, such that the display device 120 can display the corresponding output frame image of the output frame image pulse MPO1. Alternatively stated, the corresponding output frame image of the output frame image pulse MPO1 is a version of the corresponding frame image of the frame image pulse MPA1 having the output resolution.

Since the processing device 110 needs time to process the frame image pulse MPA1, the starting edge of the output frame image pulse MPO1 is after the starting edge of the frame image pulse MPA1, and the ending edge of the output frame image pulse MPO1 is after the ending edge of the frame image pulse MPA1. Alternatively stated, the moment TO3 is after the moment TA3, for example, the moment TO3 is located between the moment TA3 and the moment TA4. The moment TO4 is after the moment TA4.

In some embodiments, a time length VA1 from the moment TA1 to the moment TA4 and a time length ARA1 from the moment TA3 to the moment TA4 are determined by the resolution and the frame rate of the input image signal SA1. When the resolution of the input image signal SA1 is higher and/or the frame rate of the input image signal SA1 is lower, the time lengths VA1 and ARA1 are longer.

On the other hand, a time length VO1 from the moment TO1 to the moment TO4 and a time length ARO1 from the moment TO3 to the moment TO4 are determined by the resolution and the frame rate of the output image signal SO1. When the resolution of the output image signal SO1 is higher and/or the frame rate of the output image signal SO1 is lower, the time lengths VO1 and ARO1 are longer.

Referring to FIG. 1 and FIG. 2, the processing device 110 can determine the moments TO1 and TO3 according to the time lengths VA1, ARA1, VO1 and ARO1 (that is, according to the resolution, the frame rate of the input image signal SA1 and the resolution, the frame rate of the output image signal SO1). For example, the processing device 110 can calculate the moments TO1 and TO3 according to the following equation 1 and equation 2:

$$TO1 = TA1 + \mathrm{VA1} - VO1 + DLY1; \quad \text{(equation 1)}$$

$$TO3 = TO1 + VO1 - ARO1 = TA1 + \mathrm{VA1} - ARO1 + DLY1. \quad \text{(equation 2)}$$

According to the equation 1 and equation 2, when the output resolution is increased and/or the frame rate is decreased, the time lengths VO1 and ARO1 are increased, such that the moment TO3 approaches the moment TA3 and moves away from the moment TA4, and the moment TO1 approaches the moment TA1 and moves away from the moment TA4. When the output resolution is decreased and/or the frame rate is increased, the time lengths VO1 and ARO1 are decreased, such that the moment TO3 moves away from the moment TA3 and approaches the moment TA4, and the moment TO1 moves away from the moment TA1 and approaches the moment TA4.

On the other hand, when the resolution of the input image signal SA1 is increased and/or the frame rate of the input image signal SA1 is decreased (such as changing between different image sources), the time length VA1 is increased, such that the moment TO1 moves away from the moment TA1, and the moment TO3 moves away from the moment TA3. When the resolution of the input image signal SA1 is decreased and/or the frame rate of the input image signal SA1 is increased, the time length VA1 is increased, such that the moment TO1 approaches the moment TA1, and the moment TO3 approaches the moment TA3.

The time length DLY1 in the equation 1 and equation 2 is a time length difference between the moment TA4 and the moment TO4, and is determined by the processing device 110. In general, the time length DLY1 is smaller than the time length ARO1. For example, the time length DLY1 can be a half, one-fourth or one-eighth of the time length ARO1. Various ratio relationships between the time lengths DLY1 and ARO1 are contemplated as within the scope of present disclosure.

In some embodiments, after the processing device 110 processes pixels of the frame image pulse MPA1, the processing device 110 outputs the processed pixels as the output frame image pulse MPO1 instantly. In the embodiments described above, the time length DLY1 can be the required time length of the processing device 110 transforming one pixel of the frame image pulse MPA1 into one pixel of the output frame image pulse MPO1. Since the time of the processing device 110 processing one pixel can be very short, the time difference between the ending edge of the frame image pulse MPA1 and the ending edge of the output frame image pulse MPO1 can also be very short. Alternatively stated, the time length DLY1 between the moments TA4 and TO4 can be very short.

In some approaches, after a processing device processes an entire input frame image pulse, the processing device outputs the processed frame image pulse as an output frame image pulse, such that the time difference between an ending edge of the input frame image pulse and an ending edge of the output frame image pulse is larger than a time length of the output frame image pulse. As a result, an image displayed by a display device according to the output frame image pulse has at least a time difference of one frame comparing to the input, which is a disadvantage to applications requiring rapid reaction, such as E-sport games.

Comparing to above approaches, in the embodiments of present disclosure, the processing device 110 determines the timing of the output image signal SO1 according to equation 1 and equation 2, to start providing the output frame image pulse MPO1 to the display device 120 before the ending edge of the frame image pulse MPA1. As a result, the time difference between the image displayed by the display device 120 and the input image signal SA1 can be reduced.

Figure 3:
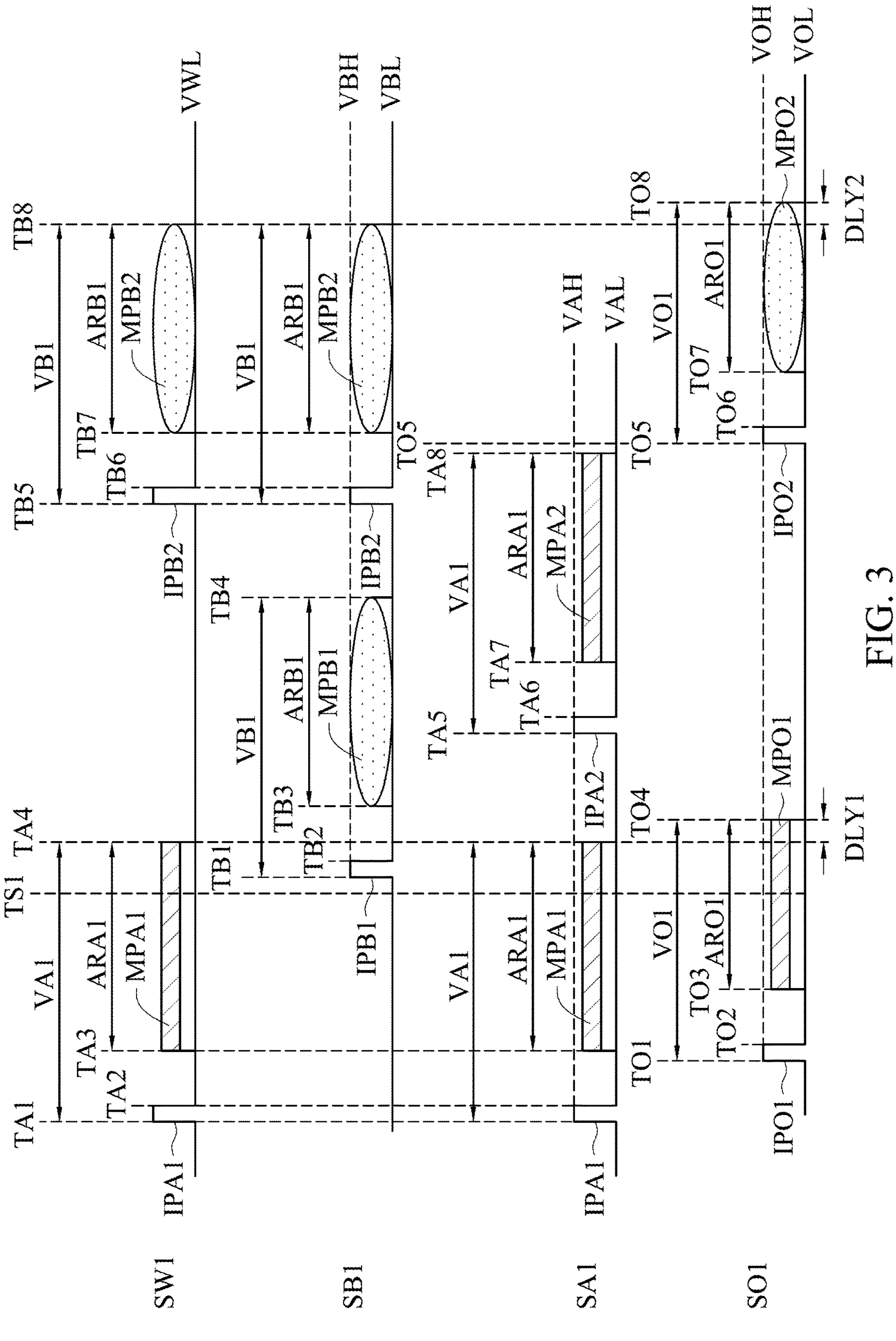
FIG. 3 is a timing diagram of the input image signal, the switching image signal and the output image signal shown in FIG. 1, illustrated according to some embodiment of present disclosure.

FIG. 3 is a timing diagram of the input image signal SA1, SB1, the switching image signal SW1 and the output image signal SO1 shown in FIG. 1, illustrated according to some embodiment of present disclosure. Referring to FIG. 3 and FIG. 2, FIG. 3 discloses further details of the input image signal SA1 and the output image signal SO1. For brevity, the discussion will focus more on differences between FIG. 3 and FIG. 2 than on similarities.

Comparing to FIG. 2, in FIG. 3, the input image signal SA1 further includes an initial pulse IPA2 and a frame image pulse MPA2, and the output image signal SO1 further includes an output initial pulse IPO2 and an output frame image pulse MPO2.

As shown in FIG. 3, a starting edge of the initial pulse IPA2 is at a moment TA5, and an ending edge of the initial pulse IPA2 is at a moment TA6. A starting edge of the frame image pulse MPA2 is at a moment TA7, and an ending edge of the frame image pulse MPA2 is at a moment TA8. The moments TA1-TA8 are arranged in order.

From the moment TA4 to the moment TA5, the input image signal SA1 is maintained at a voltage level VAL. From the moment TA5 to the moment TA6, the input image signal SA1 is maintained at a voltage level VAH, to generate the initial pulse IPA2. From the moment TA6 to the moment TA7, the input image signal SA1 is maintained at the voltage level VAL. From the moment TA7 to the moment TA8, the input image signal SA1 has the frame image pulse MPA2. After the moment TA8, the input image signal SA1 is maintained at the voltage level VAL.

Similar with the frame image pulse MPA1, the voltage levels of the frame image pulse MPA2 also correspond to a frame image. In some embodiments, the frame image corresponding to the frame image pulse MPA2 is the next frame of the frame image corresponding to the frame image pulse MPA1.

In some embodiments, the time lengths from the initial pulse of the input image signal SA1 to the frame image pulse are fixed. For example, the time length from the moment TA1 to the moment TA2 is same as the time length from the moment TA5 to the moment TA6, and the time length from the moment TA2 to the moment TA3 is same as the time length from the moment TA6 to the moment TA7.

As shown in FIG. 3, the input image signal SB1 includes initial pulses IPB1, IPB2 and frame image pulses MPB1, MPB2. A starting edge of the initial pulse IPB1 is at a moment TB1, and an ending edge of the initial pulse IPB1 is at a moment TB2. A starting edge of the frame image pulse MPB1 is at a moment TB3, and an ending edge of the frame image pulse MPB1 is at a moment TB4. A starting edge of the initial pulse IPB2 is at a moment TB5, and an ending edge of the initial pulse IPB2 is at a moment TB6. A starting edge of the frame image pulse MPB2 is at a moment TB7, and an ending edge of the frame image pulse MPB2 is at a moment TB8. The moments TB1-TB8 are arranged in order.

Before the moment TB1, the input image signal SB1 is maintained at a voltage level VBL. From the moment TB1 to the moment TB2, the input image signal SB1 is maintained at a voltage level VBH, to generate the initial pulse IPB1. From the moment TB2 to the moment TB3, the input image signal SB1 is maintained at the voltage level VBL. From the moment TB3 to the moment TB4, the input image signal SB1 has the frame image pulse MPB1. From the moment TB4 to the moment TB5, the input image signal SB1 is maintained at a voltage level VBL. From the moment TB5 to the moment TB6, the input image signal SB1 is maintained at a voltage level VBH, to generate the initial pulse IPB2. From the moment TB6 to the moment TB7, the input image signal SB1 is maintained at the voltage level VBL. From the moment TB7 to the moment TB8, the input image signal SB1 has the frame image pulse MPB2. After the moment TB8, the input image signal SB1 is maintained at the voltage level VBL.

In some embodiments, the time lengths between the initial pulse of the input image signal SB1 and the frame image pulse are fixed. For example, the time length from the moment TB1 to the moment TB2 is same as the time length from the moment TB5 to the moment TB6, and the time length from the moment TB2 to the moment TB3 is same as the time length from the moment TB6 to the moment TB7.

Similar with the frame image pulses MPA1 and MPA2, the voltage levels of the frame image pulse MPB1 and the voltage levels of the frame image pulse MPB2 correspond to two frame images arranged in order, respectively. The switching image signal SW1 includes the frame image pulse MPA1 and MPB2. Therefore, the switching image signal SW1 has a previous frame image of the input image signal SA1 and a next frame image of the input image signal SB1.

In some embodiments, the processing device 110 combines the input image signals SA1 and SB1 to the switching image signal SW1. Correspondingly, the switching image signal SW1 includes the initial pulses IPA1, IPB2 and the frame image pulses MPA1, MPB2.

In operations, the processing device 110 switches the switching image signal SW1 from the input image signal SA1 to the input image signal SB1 in response to a switch port command. For example, the processing device 110 receives the switch port command at a moment TS1 between the moments TA3 and TA4. Correspondingly, after the switching circuit 111 outputs the frame image pulse MPA1 as the switching image signal SW1, from the moment TA4 to the moment TA5, the processor 110 maintains the switching image signal SW1 at a voltage level VWL, in which the voltage level VWL is one of the voltage levels VAL and VBL. Then, in response to the initial pulse IPB2 after the moment TA4, the switching circuit 111 outputs the initial pulse IPB2 and the frame image pulse MPB2 as the switching image signal SW1.

In the embodiment described above, the display device 120 displays the frame images corresponding to the frame image pulses MPA1 and MPB2 in order (that is, the frame images corresponding to the output frame image pulse MPO1 and MPB2), and does not display the frame images corresponding to the frame image pulses MPA2 and MPB1.

In some approaches, when a switching circuit receives a switch port command, the switching circuit switches from one input image signal to another input image signal instantly, such that two frame image pulses of the two input image signals are mixed in a switching image signal. As a result, a quality of frame images of the switching image signal is poor. In order to avoid the frame images with poor quality, a display device will display frame images before the switch port command repeatedly, which causes the image delay.

Comparing to above approaches, in the embodiments of present disclosure, after the switching circuit 111 outputs the entire frame image pulse MPA1 as the switching image signal SW1, the switching image signal SW1 is maintained at the voltage level VWL until the initial pulse IPB2, and the switching circuit 111 outputs the entire frame image pulse MPB2 as the switching image signal SW1. As a result, the switching image signal SW1 does not have mixed frame images, such that the image quality is improved. Correspondingly, the display device 120 does not need to display frame images before the switch port command repeatedly, such that the image delay is reduced.

As shown in FIG. 3, a starting edge of the output initial pulse IPO2 is at a moment TO5, and an ending edge of the output initial pulse IPO2 is at a moment TO6. A starting edge of the output frame image pulse MPO2 is at a moment TB7, and an ending edge of the output frame image pulse MPO2 is at a moment TB8. The moments TB1-TB8 are arranged in order.

From the moment TO4 to the moment TO5, the input image signal SO1 is maintained at a voltage level VOL. From the moment TO5 to the moment TO6, the input image signal SO1 is maintained at a voltage level VOH, to generate the initial pulse IPO2. From the moment TO6 to the moment TO7, the input image signal SO1 is maintained at the voltage level VOL. From the moment TO7 to the moment TO8, the input image signal SO1 has the frame image pulse MPO2. After the moment TO8, the input image signal SO1 is maintained at the voltage level VOL.

Similar with the output frame image pulse MPO1, the voltage levels of the output frame image pulse MPO2 also corresponds to one frame image. In some embodiment, the frame image corresponding to the output frame image pulse MPO2 is the next frame of the frame image corresponding to the output frame image pulse MPO1. The display device 120 displays the two frame images corresponding to the output frame image pulses MPO1 and MPO2 in order.

In some embodiments, the time lengths between the initial pulse of the output image signal SO1 and the frame image pulse are fixed. For example, the time length from the moment TO1 to the moment TO2 is same as the time length from the moment TO5 to the moment TO6, and the time length from the moment TO2 to the moment TO3 is same as the time length from the moment TO6 to the moment TO7.

In some embodiments, the initial pulse IPB2 can trigger the processing device 110, such that the processing device 110 prepares to process the following frame image pulse MPB2. The output initial pulse IPO2 can trigger the display device 120, such that the display device 120 prepares to display a corresponding output frame image according to the following output frame image pulse MPO2.

Referring to FIG. 1 and FIG. 3, the processing device 110 processes the frame image pulse MPB2 to generate the output frame image pulse MPO2. The processing device 110 transform the corresponding frame image of the frame image pulse MPB2 to the output resolution of the output image signal SO1, such that the display device 120 can display the corresponding output frame image of the output frame image pulse MPO2. Alternatively stated, the corresponding output frame image of the output frame image pulse MPO2 is a version of the corresponding frame image of the frame image pulse MPB2 having the output resolution.

Since the processing device 110 need time to process the frame image pulse MPB2, the starting edge of the output frame image pulse MPO2 is after the starting edge of the frame image pulse MPB2, and the ending edge of the output frame image pulse MPO2 is after the ending edge of the frame image pulse MPB2. Alternatively stated, the moment TO7 is after the moment TB7, for example, the moment TO7 is located between the moment TB7 and the moment TB8. The moment TO8 is after the moment TB8.

In some embodiments, a time length VB1 from the moment TB5 to the moment TB8 and a time length ARB1 from the moment TB7 to the moment TB8 are determined by the resolution and the frame rate of the input image signal SB1. When the resolution of the input image signal SB1 is higher and/or the frame rate of the input image signal SB1 is lower, the time lengths VB1 and BRB1 are longer. On the other hand, a time length from the moment TO5 to the moment TO8 is the time length VO1, and a time length from the moment TO7 to the moment TO8 is the time length ARO1. The relationships between the time lengths VO1, ARO1 and the resolution and the frame rate of the output image signal SO1 are described above with the embodiments associated with FIG. 2, and thus not repeat herein.

Referring to FIG. 1 and FIG. 3, the processing device 110 can determine the moments TO5 and TO7 according to the time lengths VB1, ARB1, VO1 and ARO1 (that is, according to the resolution, the frame rate of the input image signal SB1 and the resolution, the frame rate of the output image signal SO1). For example, the processing device 110 can calculate the moments TO5 and TO7 according to the following equation 3 and equation 4:

$$TO5 = TB5 + VB1 - VO1 + DLY2; \quad \text{(equation 3)}$$

$$TO7 = TO5 + VO1 - ARO1 = TB5 + VB1 - ARO1 + DLY2. \quad \text{(equation 4)}$$

According to the equation 3 and equation 4, when the output resolution is increased and/or the frame rate is decreased, the time lengths VO1 and ARO1 are increased, such that the moment TO7 approaches the moment TB7 and moves away from the moment TB8, and the moment TO5 approaches the moment TB5 and moves away from the moment TB8. When the output resolution is decreased and/or the frame rate is increased, the time lengths VO1 and ARO1 are decreased, such that the moment TO7 moves away from the moment TB7 and approaches the moment TB8, and the moment TO5 moves away from the moment TB5 and approaches the moment TB8.

On the other hand, when the resolution of the input image signal SB1 is increased and/or the frame rate of the input image signal SB1 is decreased (such as changing between different image sources), the time length VB1 is increased, such that the moment TO5 moves away from the moment TB5, and the moment TO7 moves away from the moment TB7. When the resolution of the input image signal SB1 is decreased and/or the frame rate of the input image signal SB1 is increased, the time length VB1 is increased, such that the moment TO5 approaches the moment TB5, and the moment TO7 approaches the moment TB7.

The time length DLY2 in the equation 3 and equation 4 is a time length difference between the moment TB4 and the moment TO8, and is determined by the processing device 110. In general, the time length DLY2 is smaller than the time length ARO1. For example, the time length DLY2 can be a half, one-fourth or one-eighth of the time length ARO1. Various ratio relationships between the time lengths DLY2 and ARO1 are contemplated as within the scope of present disclosure.

In some embodiments, after the processing device 110 processes pixels of the frame image pulse MPB2, the processing device 110 outputs the processed pixels as the output frame image pulse MPO2 instantly. In the embodiments described above, the time length DLY2 can be the required time length of the processing device 110 transforming one pixel of the frame image pulse MPB2 into one pixel of the output frame image pulse MPO2. Since the time of the processing device 110 processing one pixel can be very short, the time difference between the ending edge of the frame image pulse MPB2 and the ending edge of the output frame image pulse MPO2 can also be very short. Alternatively stated, the time length DLY2 between the moments TB8 and TO8 can be very short. As a result, comparing to other approaches, the embodiments of present disclosure can reduce the time difference between the image displayed by the display device 120 and the input image signal SB1.

Figure 4:
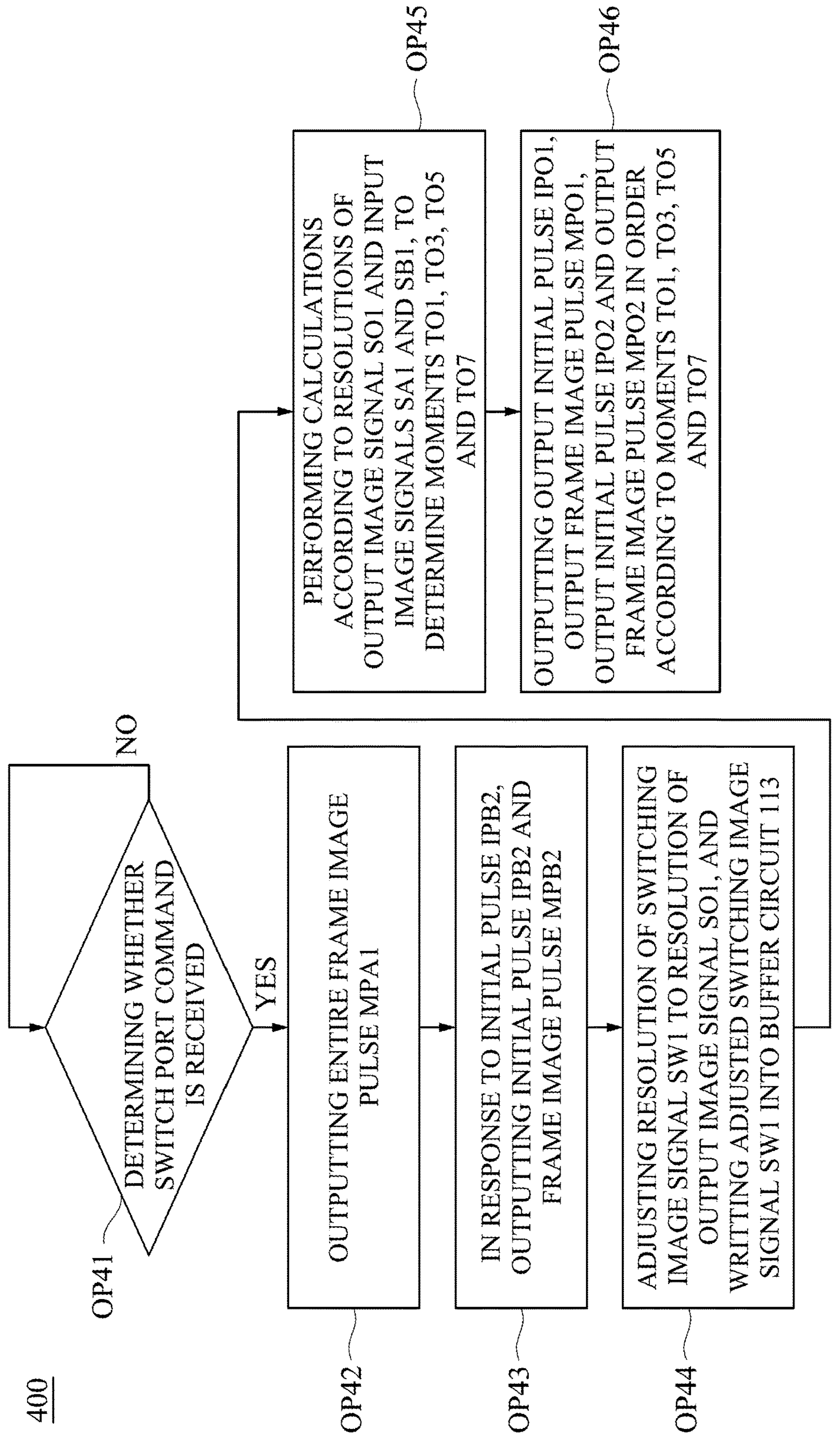
FIG. 4 is a flowchart diagram of a method of operating the display system shown in FIG. 1 to generate the output image signal, illustrated according to some embodiment of present disclosure.

FIG. 4 is a flowchart diagram of a method 400 of operating the display system 100 shown in FIG. 1 to generate the output image signal SO1, illustrated according to some embodiment of present disclosure. The method 400 includes the operations OP41-OP46. In other embodiments, the method 400 can also be performed by display systems other than the display system 100.

At the operation OP41, the processing device 110 determines whether the switch port command is received. When the processing device 110 does not receive the switch port command, the processing device 110 performs the operation OP41 repeatedly. When the processing device 110 receives the switch port command, the processing device 110 performs the operation OP42.

At the operation OP42, the switching circuit 111 outputs the entire frame image pulse MPA1 as the switching image signal SW1.

At the operation OP43, in response to the initial pulse IPB2, the switching circuit 111 outputs the initial pulse IPB2 and the frame image pulse MPB2 as the switching image signal SW1.

At the operation OP44, the processing device 110 performs the operation OP11 of adjusting resolution, to adjust the resolution of the switching image signal SW1 to the resolution of the output image signal SO1, and writes the adjusted switching image signal SW1 into the buffer circuit 113.

At the operation OP45, the processing device 110 performs calculations according to resolutions of the output image signal SO1 and the input image signals SA1 and SB1, to determine the moments TO1, TO3, TO5 and TO7.

At the operation OP46, the processing device 110 outputs the output initial pulse IPO1, the output frame image pulse MPO1, the output initial pulse IPO2 and the output frame image pulse MPO2 in order according to the moments TO1, TO3, TO5 and TO7, such that the output frame image pulse MPO1 and the frame image pulse MPA1 have the time length DLY1 in between, and the output frame image pulse MPO2 and the frame image pulse MPB2 have the time length DLY2 in between.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method of generating image signals, comprising:

receiving a first input image signal and a second input image signal by a processing device;

switching from the first input image signal to the second input image signal, to generate an output image signal;

outputting, by the processing device, the output image signal having an output resolution according to the first input image signal and the second input image signal; and outputting the output image signal from the processing device to a display device, wherein an ending edge of a first frame image pulse of the first input image signal is at a first moment, an ending edge of a first output frame image pulse of the output image signal is at a second moment, a first time length from the first moment to the second moment is smaller than a time length of the first output frame image pulse, the first output frame image pulse corresponds to a first output frame image, the first frame image pulse corresponds to a first frame image, the first output frame image is a version of the first frame image having the output resolution, a second output frame image pulse of the output image signal corresponds to a second frame image pulse of the second input image signal, the output image signal comprises a first output initial pulse before the first output frame image pulse and a second output initial pulse before the second output frame image pulse, a starting edge of the second output initial pulse is at a third moment, and from the second moment until the third moment, a voltage level of the output image signal is maintained invariant.

2. The method of claim 1, wherein a starting edge of the first frame image pulse is at a fourth moment, a starting edge of the first output frame image pulse is at a fifth moment, the fifth moment is between the fourth moment and the first moment, and when the output resolution is increased or a frame rate of the output image signal is decreased, a time length between the fifth moment and the fourth moment is decreased and a time length between the fifth moment and the first moment is increased.

3. The method of claim 2, wherein when a first resolution of the first frame image is increased or a frame rate of the first input image signal is decreased, the time length between the fifth moment and the fourth moment is increased.

4. The method of claim 3, wherein the first input image signal comprises a first initial pulse before the first frame image pulse, a starting edge of the first initial pulse is at a sixth moment, a starting edge of the first output initial pulse is at a seventh moment, and when the output resolution is increased or the frame rate of the output image signal is decreased, a time length between the seventh moment and the sixth moment is decreased and a time length between the seventh moment and the first moment is increased.

5. The method of claim 4, wherein when the first resolution is increased or the frame rate of the first input image signal is decreased, the time length between the seventh moment and the sixth moment is increased.

6. The method of claim 1, wherein an ending edge of the second frame image pulse of the second input image signal is at a fourth moment, an ending edge of the second output frame image pulse of the output image signal is at a fifth moment, a second time length from the fourth moment to the fifth moment is smaller than the time length of the first output frame image pulse,
the second output frame image pulse corresponds to a second output frame image,
the second frame image pulse corresponds to a second frame image, and
the second output frame image is a version of the second frame image having the output resolution.

7. The method of claim 6, wherein
a starting edge of the second frame image pulse is at a sixth moment,
a starting edge of the second output frame image pulse is at a seventh moment, and
when the output resolution is increased or a frame rate of the output image signal is decreased, a time length between the seventh moment and the sixth moment is decreased and a time length between the seventh moment and the fourth moment is increased.

8. The method of claim 7, wherein when a second resolution of the second frame image is increased or a frame rate of the second input image signal is decreased, the time length between the seventh moment and the sixth moment is increased.

9. The method of claim 8, wherein
the second input image signal comprises a second initial pulse before the second frame image pulse,
a starting edge of the second initial pulse is at an eighth moment, and
when the output resolution is increased or the frame rate of the output image signal is decreased, a time length between the third moment and the eighth moment is decreased and a time length between the third moment and the fourth moment is increased.

10. The method of claim 9, wherein when the second resolution is increased or the frame rate of the second input image signal is decreased, the time length between the third moment and the eighth moment is increased.

11. The method of claim 1, wherein along a time direction, an initial pulse of the second input image signal is between the first moment and a starting edge of the first output frame image pulse.

12. A display system, comprising:
a processing device generating an output image signal by switching from a first image signal to a second image signal; and
a display device electrically coupled to the processing device and displaying images according to the output image signal,
wherein the processing device obtaining an output resolution of a first output frame image pulse of the output image signal according to a first resolution of a first frame image pulse of the first image signal and a resolution required by the display device, and adjusting a starting edge of the first output frame image pulse to a third moment between a first moment and a second moment,
a starting edge of the first frame image pulse is at the first moment,
an ending edge of the first frame image pulse is at the second moment,
an ending edge of the first output frame image pulse of the output image signal is at a fourth moment,
a second output frame image pulse of the output image signal corresponds to a second frame image pulse of the second image signal,
the output image signal comprises a first output initial pulse before the first output frame image pulse and a second output initial pulse before the second output frame image pulse,
a starting edge of the second output initial pulse is at a fifth moment, and
from the fourth moment until the fifth moment, a voltage level of the output image signal is maintained invariant.

13. The display system of claim 12, wherein the processing device further performs calculations to a second resolution of the second frame image pulse of the second image signal and the output resolution, to adjusting a starting edge of the second output frame image pulse of the output image signal to a sixth moment between a fourth seventh moment and a eighth moment,
a starting edge of the second frame image pulse is at the seventh moment, and
an ending edge of the second frame image pulse is at the eighth moment.

14. A method of generating image signals, comprising:
receiving a first input image signal and a second input image signal by a processing device;
switching from the first input image signal to the second input image signal, to generate an output image signal;
outputting, by the processing device, the output image signal having an output resolution according to the first input image signal and the second input image signal; and
outputting the output image signal from the processing device to a display device,
wherein an ending edge of a first frame image pulse of the first input image signal is at a first moment,
an ending edge of a first output frame image pulse of the output image signal is at a second moment,
a first time length from the first moment to the second moment is smaller than a time length of the first output frame image pulse,
the first output frame image pulse corresponds to a first output frame image,
the first frame image pulse corresponds to a first frame image,
the first output frame image is a version of the first frame image having the output resolution,
a starting edge of the first frame image pulse is at a third moment,
a starting edge of the first output frame image pulse is at a fourth moment, and
the fourth moment is between the third moment and the first moment,
a second output frame image pulse of the output image signal corresponds to a second frame image pulse of the second input image signal,
the output image signal comprises a first output initial pulse before the first output frame image pulse and a second output initial pulse before the second output frame image pulse,
a starting edge of the second output initial pulse is at a fifth moment, and
from the second moment until the fifth moment, a voltage level of the output image signal is maintained invariant.

15. The method of claim 14, wherein
an ending edge of the second frame image pulse of the second input image signal is at a sixth moment,
an ending edge of the second output frame image pulse of the output image signal is at a seventh moment, a second time length from the sixth moment to the seventh moment is smaller than the time length of the first output frame image pulse, the second output frame image pulse corresponds to a second output frame image, the second frame image pulse corresponds to a second frame image, and the second output frame image is a version of the second frame image having the output resolution.

16. The method of claim 15, wherein a starting edge of the second frame image pulse is at an eighth moment, a starting edge of the second output frame image pulse is at a ninth moment, and when the output resolution is increased or a frame rate of the output image signal is decreased, a time length between the ninth moment and the eighth moment is decreased and a time length between the ninth moment and the sixth moment is increased.

17. The method of claim 16, wherein when a second resolution of the second frame image is increased or a frame rate of the second input image signal is decreased, the time length between the ninth moment moves away from the eighth moment.

18. The method of claim 17, wherein the second input image signal comprises a first initial pulse before the second frame image pulse, a starting edge of the first initial pulse is at a tenth moment, and when the output resolution is increased or the frame rate of the output image signal is decreased, a time length between the fifth moment and the tenth moment is decreased and a time length between the fifth moment and the sixth moment is increased.

19. The method of claim 18, wherein when the second resolution is increased or the frame rate of the second input image signal is decreased, the time length between the fifth moment and the tenth moment is increased.

* * * * *